Patented Apr. 23, 1929.

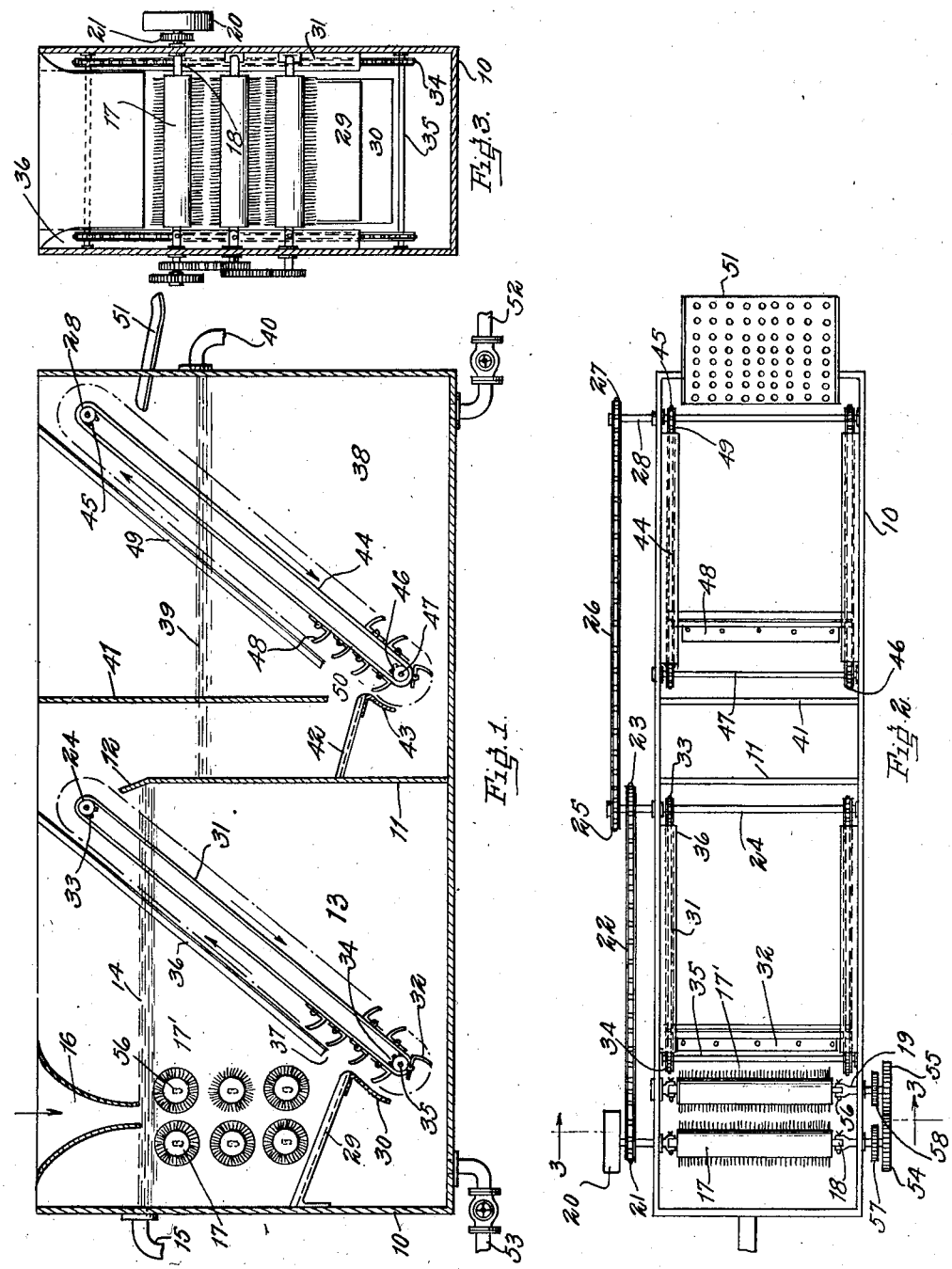

1,710,357

UNITED STATES PATENT OFFICE.

ARTHUR D. GRÜNWALD, OF DRANGSTEDT, GERMANY.

TABLE-SILVER-WASHING MACHINE.

Application filed April 16, 1928. Serial No. 270,318.

This invention relates to improvements in washing machines for table silver such as knives, forks and spoons, and it is the principal object of my invention to provide a machine in which the silver is first subjected to the action of a plurality of sets of pairwise arranged cleaning brushes and is then conveyed into a rinsing tank and conveyed through the same to be delivered onto a drainer.

Another object of my invention is the provision of a machine of this character equipped with means for positively guiding even the smallest articles onto the conveyers which are equipped with suitable conveyer dogs for the transportation of the silver through the washing and rinsing tanks.

A further object of my invention is the provision of a washing machine for spoons, knives and forks of simple and therefore inexpensive construction, yet durable and efficient in its operation.

These and other objects and advantages of my invention will become more fully apparent as the description thereof proceeds, and will then be specifically defined in the appended claims.

In the accompanying drawing forming a material part of this disclosure:

Fig. 1 is a longitudinal section through a knife, spoon and fork washing machine constructed according to my invention.

Fig. 2 is a top plan view thereof.

Fig. 3 is a cross-section through the machine on line 3—3 of Figure 2.

As illustrated, the machine constructed according to my invention comprises a tank 10 of proper dimensions and suitable material. A vertical partition 11 reaching from the tank's bottom to nearly the top thereof has its upper edge 12 angularly disposed to its body part, and partition 11 forms a compartment 13 in the tank adapted to be filled with the wash water and such suds as are desirable or required to a level indicated at 14, while an overflow-pipe 15 prevents the liquid in the tank from rising beyond or above said level.

The spoons, knives and forks are fed to the tank through a hopper 16 on top of the tank and below the lower opening they pass through a plurality of rotary brushes 17 pairwise arranged in any desired number of sets, the shafts 18 of which are exchangeably held in suitable bearings 19.

The shaft 18 of one of the brushes, preferably the first one of the uppermost set projects over the side wall of the tank and carries a belt pulley 20 and a sprocket wheel 21 in juxtaposition thereto over which a chain 22 is guided, which is also guided over a sprocket wheel 23 on a shaft 24 extending transversely through the tank and journalled in suitable bearings carrying also another sprocket wheel 25 in juxtaposition thereto over which runs a chain 26 which is also guided over a sprocket wheel 27 on a shaft 28 also extending cross-wise through the tank and journalled in suitable bearings.

The spoons, forks and knives washed during their passage between the brushes fall upon an inclined platform 29 attached at one end to the inner face of one of the end walls of the tank to the other lower end of which a depending guard 30 is attached.

An endless link chain conveyer 31 equipped with a plurality of grippers 32 arranged in suitably spaced relation to each other on the outer face of the chain is guided over sprocket wheels 33 within tank 10 on shaft 24 and over sprocket wheels 34 on a shaft 35 conveniently journalled on the tank 10 at a lower level than shaft 24.

An inclined protecting plate 36 protects the conveyer chains on top but its lower end is spaced from the inclined platform 29 so as to leave a space 37 just large enough for the passage of the spoons, forks and knives to positively ensure their engagement by the grippers so that even the smallest spoons, knives and forks are prevented from falling to the bottom of the tank.

The other chamber 38 formed in the tank by partition 11 is intended for the reception of the rinsing water, the highest level of which is indicated at 39 and regulated by an overflow pipe 40.

A partition 41 extends from the top into the tank parallel to and in spaced relation to partition 11 and ends at a certain distance above the bottom of the tank. This partition 41 forms with the partition 11 a guide channel for preventing a scattering of the forks, knives, and spoons delivered from conveyer 31 into the rinsing tank 38, directing them to and ensuring their delivery onto an inclined platform.

To the outer face of partition wall 11 near its lower end an inclined platform 42 is secured equipped at the lower face of its outer end with a guard 43.

A link chain conveyer 44 is guided over sprocket wheels 45 on shaft 28 within tank 10 and over sprocket wheels 46 on a shaft 47 journalled in the tank parallel to but at a lower level than shaft 28.

The conveyer 44 has its upper face equipped with a plurality of gripper dogs 48 suitably spaced from each other, and an inclined protecting plate 49 protects the conveyer from above, its lower end however being suitably spaced from the partition 41 and inclined platform 42, as at 50 which space is just large enough so that the forks, spoons and knives deposited by conveyer 31 upon platform 42 will be positively forced to engage the gripper dogs and be prevented from falling to the bottom of the tank.

A perforated inclined delivery sieve-plate is adapted to receive the forks, spoons and knives after their passage through the rinsing chamber 38.

Suitable valve controlled discharge conduits 52, 53 are provided at the bottom of tank 10, and a gear 54 on the end of shaft 18 opposite to the belt pulley and projecting from the tank meshes with a similar gear 55 on shaft 56 of brush 17′ while gears 57, 58 mesh with suitable gears on the shafts for the brushes next below etc.

The operation of my device will be entirely clear from the above description, and by inspection of the drawing. The silver is fed to the machine through hopper 16 and is cleaned in the compartment 13 of the tank 10 between the revolving sets of brushes receiving their revolutions from any desired source of power by the intermediary of pulley 20 and the gearings described. The washed spoons, forks and knives are then deposited onto inclined platform 29 and fall from there in the spaces between the grippers on the conveyer 31, the space 37 being so selected that even the smallest mocha spoons etc. will positively be fed to the conveyer. The grease and fat floating on top of the water in chamber 13 will be removed through overflow pipe 15.

From conveyer 31 the table-silver, which is now preliminarily freed of the adhering grease etc. by the hot soap suds water, is then delivered over the upper end of partition 11 onto inclined platform 42 feeding it to the conveyer 44 in compartment 38 of tank 10 supplied with rinsing water and the silver is then delivered upon drain tray 51. An overflow pipe 40 prevents the rinsing water from flowing over the upper edge of tank 10 while the valve-controlled drain cocks 52, 53 allow a draining of the tank. Spaces 37 and 50 are so selected as to positively prevent a falling of even the smallest articles to the tank bottom.

It will be understood, that I have described and shown as an example of the many ways to practically construct my invention, the preferred form thereof, and that I may make such changes in the constructive details of my invention as come within the scope of the appended claims without departure from the spirit of the invention and principles involved.

Having thus described my invention, what I claim as new and desire to secure by Letters Patent is:

1. A table-silver washing machine comprising a tank, a partition dividing said tank into two separate chambers forming a washing chamber and a rinsing chamber, a hopper for feeding said articles into the machine, a plurality of revolving brushes pairwise arranged in superposed sets beneath said hopper, an inclined platform beneath said brushes, an endless conveyer, a plurality of grippers on said conveyer, means for ensuring the delivery of the articles onto said conveyer, an inclined platform on said partition in said rinsing chamber, a conveyer in said rinsing chamber, grippers on said conveyer and a partition extending into said rinsing chamber parallel to and spaced from said first named partition to form a guide channel for the table-silver preventing scattering thereof, means for ensuring the delivery of the articles to be rinsed to said last named conveyer, and a drain plate at the delivery end of said last named conveyer for receiving the rinsed articles from said conveyer.

2. A table-silver washing machine comprising a tank, a partition dividing said tank into a washing and a rinsing chamber, an angularly disposed upper end on said partition, a hopper for feeding the articles to be washed into the washing chamber, a plurality of rotating brushes beneath said hopper, an endless conveyer movably arranged in the washing chamber, an inclined plate receiving the articles from said brushes and delivering the same onto said conveyer, a guard on said plate ensuring safe delivery of even the smallest articles to said conveyer, a plurality of gripper dogs spaced from each other on said conveyer, a partition wall depending into the rinsing chamber of said tank spaced from the bottom thereof, and parallel to and spaced from said first named partition wall to form therewith a guide channel for the table silver delivered by the conveyer and preventing scattering of the same, an endless conveyer in the rinsing chamber, an inclined plate on said first named partition wall, onto which the washed articles are delivered from the washing conveyer, a guard on said plate for ensuring delivery of even the smallest articles to said rinsing chamber conveyer, and a perforated drain plate at the delivery end of said last mentioned conveyer for receiving the rinsed articles from said last mentioned conveyer.

Signed at New York, in the county of New York and State of New York, this 27th day of March A. D. 1928.

ARTHUR D. GRÜNWALD.